United States Patent [19]

Styok

[11] 4,403,648

[45] Sep. 13, 1983

[54] ENGINE RADIATOR SUPPORT AND GUARD ASSEMBLY

[75] Inventor: Wayne G. Styok, Peoria, Ill.

[73] Assignee: Caterpillar Tractor Co., Peoria, Ill.

[21] Appl. No.: 262,371

[22] Filed: May 11, 1981

Related U.S. Application Data

[63] Continuation of Ser. No. 47,599, Jun. 11, 1979, abandoned.

[51] Int. Cl.³ .............................................. F28F 9/00
[52] U.S. Cl. .................................... 165/76; 180/68 P; 165/149
[58] Field of Search .................... 165/76, 82, 148–153, 165/98, 99; 180/68 R, 68 P

[56] References Cited

U.S. PATENT DOCUMENTS 3,982,587  9/1976  Tramontini .......................... 165/149

Primary Examiner—William R. Cline
Assistant Examiner—Theophil W. Streule
Attorney, Agent, or Firm—Phillips, Moore, Lempio & Finley

[57] ABSTRACT

A support assembly and grill for a radiator includes a support frame which opens outwardly and upwardly to allow ready access to and removal of a radiator and is fixable to a vehicle frame. The radiator is protected from damage by a grill held in a spaced apart relation from the radiator by a guard frame. The grill and guard form a light easily removable modual assembly. The guard frame overlaps the support frame and is affixed thereto by a plurality of bolts.

11 Claims, 3 Drawing Figures

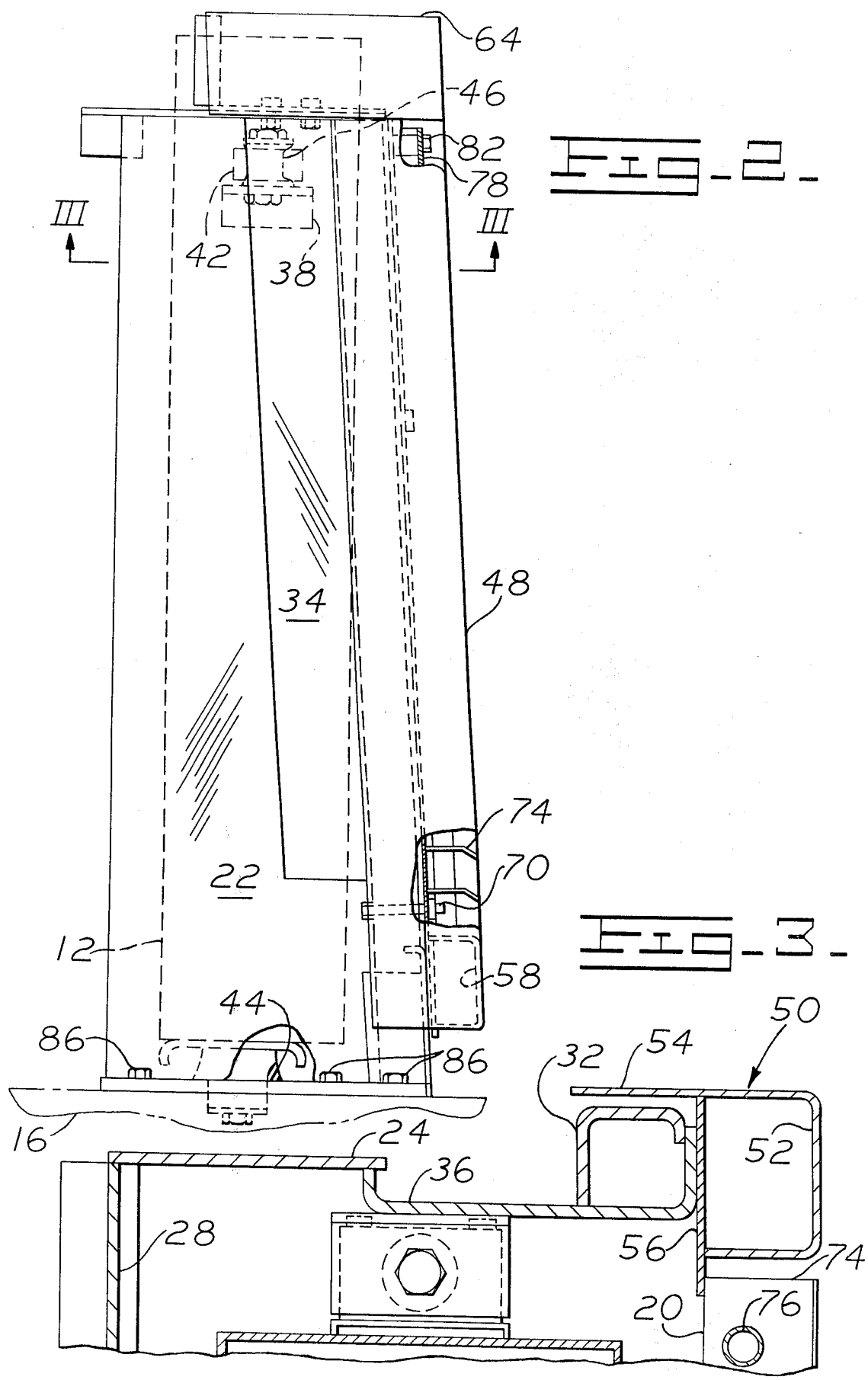

ENGINE RADIATOR SUPPORT AND GUARD ASSEMBLY

This is a continuation, of Ser. No. 47,599, filed June 11, 1979 now abandoned.

BACKGROUND OF THE INVENTION

This invention relates to a support assembly and grill for a radiator. In particular, it pertains to a radiator support assembly and grill adapted for use on construction equipment, particularly construction vehicles. It is envisioned that engine coolant and engine lubricant radiators may be positioned within the same support assembly and grill.

In all pistoned internal combustion engines of any magnitude, it is usually necessary to provide for cooling of at least one fluid utilized in the engine. In particular, a liquid cooled engine must also include some form of a heat exchanger to allow dissipation of accumulated engine heat to the ambient atmosphere. Furthermore, internal combustion engines of any magnitude generally require either a vast quantity of lubricant contained in a large lubricant reservoir, or a more workable quantity of lubricant coupled with a smaller reservoir and a lubricant cooler, commonly referred to as an oil cooler.

The environment that construction equipment is operated in is generally detrimental to the relatively fragile construction of heat exchangers, which are usually made in the form of a finned radiator. Such heat exchangers generally are the most efficient and, therefore, are utilized extensively in such equipments. Accordingly, it is necessary to first support the heat exchange relative the vehicle and, secondly, to provide sufficient protection to the heat exchanger so that the relatively vulnerable portions are not pierced or damaged by foreign objects.

Mounting a heat exchanger or a radiator of the type envisioned in this invention requires a special degree of care in that the radiator is generally comprised of a plurality of parallel-arranged passages through which the fluid to be cooled is passed. Each passage may be interconnected to the next adjacent passage by thin metal sheets or fins generally perpendicular to the axis of the passages. The thin metal sheets, as is well known in the art, conduct heat from the passages for radiation of the ambient air. Generally a fluid such as air is passed over the fins or thin metal sheets to carry away radiated heat. The very nature of this structure, coupled with the fact that a relatively soft metal such as bronze or brass is utilized for the radiator, dictates, in part, the special mounting method.

Flexure of the vehicle frame and vibrations in the frame which occur during operation, when communicated to the rather soft structure of a radiator, may result in fatigue and early failure of the radiator. Resulting rapid loss of either the cooling fluid or the lubricant from the failed radiator can cause engine failure and thus, additional expense to the operator of the vehicle. Accordingly, the radiator structure must be isolated or at least insulated from undue stresses, strains, and vibrations imparted thereto from the vehicle frame. Although the vehicle frame can be made practically rigid, a certain amount of movement between frame members due to bending and the like is almost inevitable. Vibrations in the frame may be lessened by springing and the like, but not eliminated. Accordingly, it is common practice to resiliently mount the radiator relative the frame and couple the radiator to the fluid to be cooled through flexible conduits, such as rubber tubing or the like.

The nature of the metal utilized to construct a radiator is such that protection is usually advisable and, in the construction equipment environment, usually necessary. In the heavy construction vehicle, it has been appropriate to utilize a rather massive structure to encompass the radiator. In certain instances, the grillwork was incorporated into such a structure. In most cases, it was necessary to utilize rather heavy lifting equipment to remove the protective support structure that surrounded the radiator. Thus, routine maintenance on the radiator, such as replacement of interconnecting hoses or replacement of the radiator itself, necessitated rather massive equipment to remove the supporting structure. Therefore, a failure in the cooling system in the field was a major maintenance problem requiring extensive support equipment.

SUMMARY OF THE INVENTION

The present invention is directed to overcoming one or more of the problems as set forth above.

According to the present invention, a radiator support assembly and grill for a radiator is comprised of a support frame adapted to receive a radiator. Included are resilient mountings for fixing the radiator to the support frame. A grill is provided to protect the radiator and is associated with the support frame by a guard frame. The guard frame is removably fixable to the support frame so that the grill is retained in a spaced apart relation with the radiator.

BRIEF DESCRIPTION OF THE DRAWINGS

FIG. 2 is a side elevation view partly in section of the assembled support assembly and grill of FIG. 1.

FIG. 3 is a partial sectional view of the support assembly and grill shown in FIG. 2 and taken at section line III—III.

DETAILED DESCRIPTION OF THE PREFERRED EMBODIMENT

Figure 1:
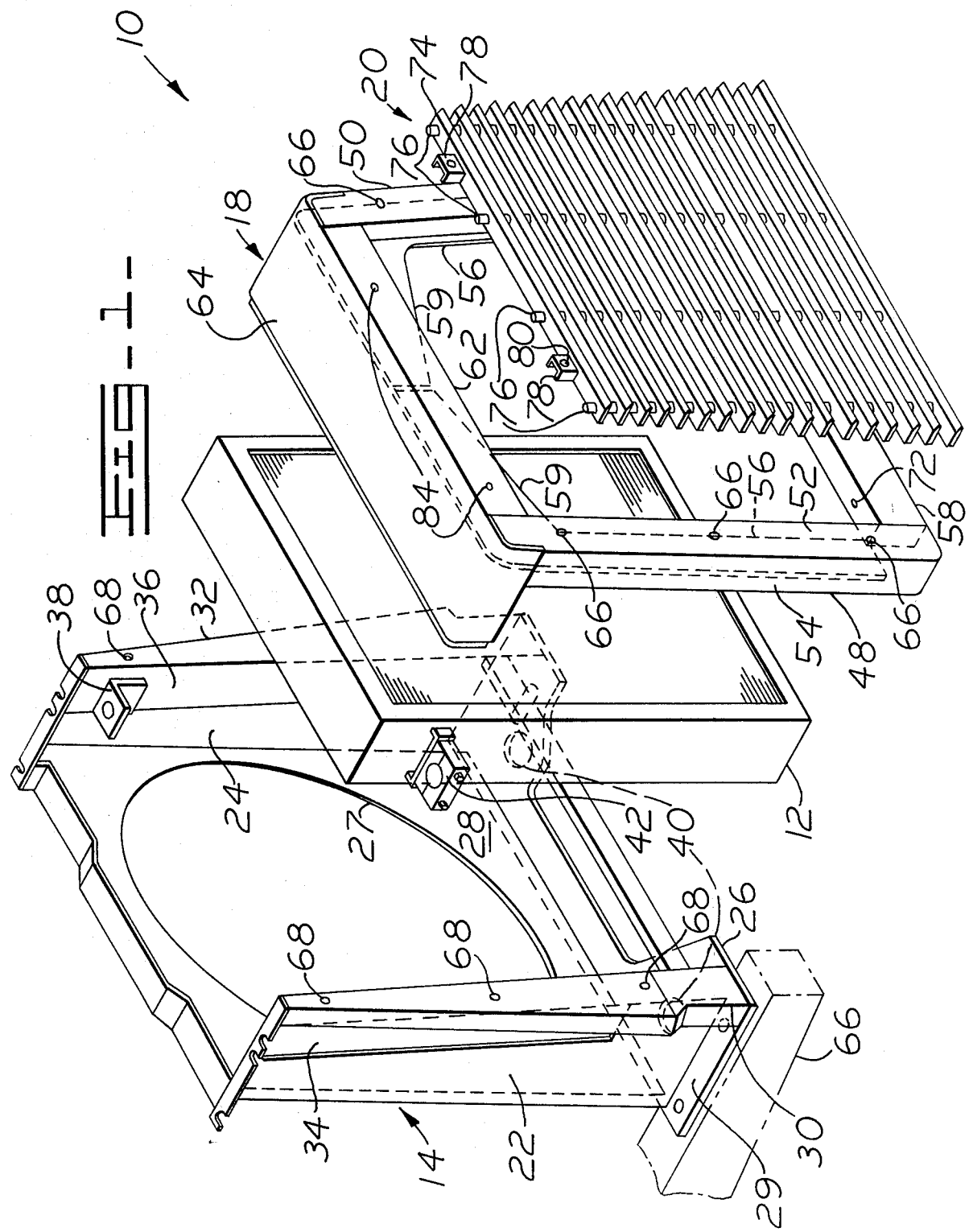
FIG. 1 is an exploded view in perspective of the support assembly and grill in accord with the present invention, and including a representative radiator.

Shown in FIG. 1 is an exploded view of a support assembly and grill 10 for a heat exchanger, such as a radiator 12 which may be used with an internal combustion engine. It is to be understood that this invention is described in the context of a heavy construction vehicle wherein radiator 12 may encompass multiple cooling units; for example, one unit for engine coolant and a second unit for engine lubricant. The structure described herein is also applicable to stationary equipment and, in fact, is applicable to any environment wherein a heat exchanger is supported by a frame and must be protected by grillwork. It is, however, particularly applicable to radiators utilized in internal combustion engined construction vehicles.

The support assembly and grill is comprised of a support frame 14 which may be affixed by appropriate means to a vehicle frame 16 or the like.

Support frame 14 is adapted to receive radiator 12 in a manner to be described. Affixed to, in a general overlapping relation, is a guard frame 18 which is adapted to receive a protective grill, such as grill 20.

Again referring to FIG. 1, taken in conjunction with FIGS. 2 and 3, it can be seen that support frame 14 is comprised of two elongated upstanding plate members 22 and 24, which are held in spaced apart relation by a bottom plate member 26, in turn affixed to corresponding ends of plate members 22 and 24. In addition to the just described structure, the support frame also includes a back plate member 28 which is integrally affixed to corresponding elongated edges of the upstanding plate members 22 and 24 and the corresponding edge of bottom plate member 26. Back plate member 28 is formed with a generally circular opening 27 having a major dimension or diameter generally equal to the major dimension of the radiator 12 to be affixed in the support frame 14.

Bottom plate member 26 extends outwardly from the corresponding ends of upstanding plate members 22 and 24 to form flanges 29, one of which is apparent in FIG. 1, which may be utilized for fixture to frame 16 and a corresponding member of frame 16 not seen in FIG. 1, but on the opposite side of support frame 14. It should be apparent that upstanding plate member 22 and upstanding plate member 24 are fixed to the bottom plate member 26 and the back plate member 28 by means well known in the art, such as welding or the like.

Integrally formed with upstanding plate member 22 and with upstanding plate member 24 are buttress members 30 and 32, a portion of which is shown in cross-section in FIG. 3. Each buttress member 30 and 32 has a generally rectangular cross-section and may be formed from several plate members as indicated in FIG. 3. Each plate member indicated in FIG. 3 would be bonded to the adjacent plate member by means such as welding or the like. It should also be apparent that the upstanding plate member 22 and the upstanding plate member 24 may be made of more than one element as indicated in FIGS. 1, 2, and 3, wherein second plate members, such as plate members 34 and 36, are bondingly associated with plate members 22 and 24, respectively. Buttresses 30 and 32 are formed with an upwardly closing taper and serve to strengthen the structure of support frame 14. Appropriate brackets, such as bracket 38, may be affixed to the upstanding plate members, such as plate members 34 and 36, for the purpose of receiving radiator 12. Similarly, mounting holes 40 may be formed in bottom plate 26 for the same purpose.

A representative radiator 12 is shown with a mounting pad 42 which would be appropriate for mounting on bracket 38. It should be understood that other radiators may be used in this particular structure and the mounting pad 42 may be modified for use with other radiators in the manner shown in FIG. 1. Nevertheless, as shown in FIG. 2, a representative radiator 12 is shown mounted in support frame 14 utilizing bracket 38 and holes 40. Appropriate resilient members, such as resilient member 44 at the bottom and resilient member 46 at the top, serve to isolate and dampen vibrations in frame 16 from reaching radiator 12.

Guard frame 18 is formed of two generally upstanding members 48 and 50, one of which is shown generally in cross-section in FIG. 3. It can be seen in FIG. 3 that each upstanding member of guard frame 18 has a generally rectangular cross-section and may be comprised of a U-shaped member 52 having one elongated leg 54 and a flat plate member 56, which connects the legs of the U-shaped member.

Elongated legs 54 are formed to overlap the outside side of buttresses 30 and 32, respectively, while flat plate member 56 abuts the front edge to which it may be affixed.

A box structure 58 may interconnect the lower ends of upstanding members 48 and 50, which taper inwardly at an angle corresponding to the angle of buttresses 30 and 32. Plate 56, which, as previously noted, connects the U-shaped leg members of upstanding members 48 and 50, extends inwardly at the upper ends thereof as can be seen in FIG. 1, and has an elongated extension 59 approaching a corresponding elongated extension 59' from plate 56' on the opposite side. Connecting upstanding member 48 and upstanding member 50 at the upper end is a plate 62, which essentially joins the webs of the U-shaped members 52 in the manner shown in FIG. 1. In addition to plate 62, a cover plate 64 extends rearwardly as shown in FIG. 1 toward support frame 14 and substantially covers the ends of the upstanding member 48 and 50 while interconnecting the two members. Appropriate fastening holes 66 are formed in upstanding members 48 and 50 in substantial alignment with corresponding mounting holes 68 found in support frame 14. Fastening means, such as bolts 70 (see FIG. 2), may be utilized to affix guard frame 18 to support frame 14.

Grill 20 is adapted to be received in guard frame 18 in an abutting relation with plates 56 and 56' and extensions 59 and 59' while means are provided on grill 20 to fit in alignment holes 72, found in box structure 58, interconnecting the upstanding members 48 and 50. Grill 20 is comprised of a plurality of louver members 74 arranged in a parallel fashion, and, when used in this embodiment, generally parallel to bottom member 58. In a construction vehicle, these may be horizontally oriented louvers. The louvers are maintained in a spaced apart relationship by a plurality of vertical members in this particular embodiment, such as tubes 76, each extending through the plurality of louvers 74 and outwardly of the base thereof, to align generally with the holes 72 found in box member 58. Thus, the spacing of the tube members 76 corresponds to the spacing of holes 72 in box member 58. Affixed to the top louver of the plurality of louvers 74 may be a pair of brackets 78, each formed with a fastening hole 80 which may receive a bolt 82, and, in turn, may be passed through a corresponding hole 84 in extensions 59 and 59', respectively.

In operation, it can be seen that with the support assembly and grill affixed together in the operating state as shown in FIG. 2, air or other cooling fluid may be passed through radiator 12 by means of a fan mounted adjacent hole 27 formed in back plate member 28. Most important to the invention, however, is the capability to quickly disassemble the grill 20 and the grill frame 18 from the major support frame 14 affixed to the vehicle frame 16 for access to the radiator 12. The grill is removed by disconnecting the bolts 82 and lifting the grill out from the guard frame 18. Bolts which may be used in holes 66 and 68 affix the guard frame 18 to support frame 14. Once the bolts are removed from holes 66, complete access is available to radiator 12 for either removal or repair as necessary. Strength is provided in this structure by support frame 14 which is rigidly affixed to frame 16 by fastening means, such as bolts 86, and the buttress members 30 and 32 lending lateral support to the upstanding plate members 22 and 24, respectively. The radiator 12 utilized in this particular embodiment is protected by the grill 20 with its louvers 74 and vertical members 76. It should be apparent to those skilled in the art that the louvers 74 and the vertical members 76 may be strengthened as necessary for particular applications, depending upon whether the radiator is positioned at the front end of the construction vehicle or at the rear end of the construction vehicle. The convenience offered by the structure, described herein, lends itself to various applications in the construction machinery field wherein strength is necessary, yet accessibility to the radiator is equally important.

Although this invention has been described in relation to a particular embodiment, it is to be understood that other modifications may be made without departing from the scope and spirit of the specification. The invention is to be considered only limited by the appended claims.

Embodiments of the invention in which an exclusive property or privilege is claimed are defined as follows:

1. An engine radiator support and guard assembly comprising:
   a support frame mountable adjacent an engine defining an open end distal the engine, said open end adapted to mountingly receive a radiator and an opening proximate the engine;
   resilient means for mounting said radiator in said support frame;
   a guard means fixable to said support frame in an overlapping relation thereto and distal of said engine.

2. The support and guard of claim 1 wherein the guard means comprises:
   a guard frame removably fixable to the support frame and overlapping the radiator; and
   a grill adapted to be received in said guard frame.

3. The support assembly and grill of claim 2 wherein the grill comprises a plurality of generally parallel louver members and at least two support members normally oriented to said plurality of said louver members, said louver members affixed to said support members in a spaced apart manner.

4. The support assembly and grill of claim 1 wherein the support frame comprises first and second upstanding plate members defining elongated edges, a bottom member interconnecting corresponding ends of said first and second upstanding plate members to retain said upstanding plate members in a generally parallel relationship, said bottom member also adapted for mounting adjacent an engine, and a back plate member interconnecting the elongated edges of said first and second upstanding plate members, said back plate member defining the said opening, said opening having a major dimension generally equal to the major dimension of the radiator, whereby cooling air may be passed through said opening.

5. The support assembly and grill of claim 4 wherein the opening in the back plate member is a circular opening.

6. The support assembly and grill of claim 4 wherein the support frame further comprises first and second buttress members integrally formed with said first and second upstanding plate members and extending outwardly therefrom in opposite directions.

7. The support assembly of claim 2 wherein the guard frame comprises:
   first and second generally vertical members;
   a bottom member;
   a top member;
   said first and second generally vertical members held in a spaced apart relation by said bottom and top members to form a generally trapezoidal opening; and
   means for fixing said first and second generally vertical members to the support frame.

8. The support assembly of claim 6 wherein the buttress members taper inwardly toward the top of said first and second upstanding plate members.

9. The support assembly of claim 3 wherein the guard frame includes a bottom member having a generally box-shaped cross-section, said bottom member defining a plurality of holes, each hole to receive an extension of the louver support members.

10. The support assembly and grill of claim 2 wherein the support frame comprises first and second upstanding plate members defining elongated edges, a bottom member interconnecting corresponding ends of said first and second upstanding plate members to retain said upstanding plate members in a generally parallel relation, said bottom member also for mounting adjacent an engine, and a back plate member interconnecting the elongated edges of said first and second upstanding plate members, said back plate member formed with a circular opening having a diameter generally equal to the major dimension of the radiator, whereby cooling air may be passed through said opening.

11. The support assembly and grill of claim 10 wherein the support frame further comprises first and second buttress members integrally formed with said first and second upstanding plate members and extending outwardly therefrom in opposite directions; and further wherein the first and second generally vertical members each include a rearwardly extending portion formed to overlap the first and second buttress members respectively.

* * * * *

UNITED STATES PATENT AND TRADEMARK OFFICE
CERTIFICATE OF CORRECTION

PATENT NO.  : 4,403,648
DATED       : September 13, 1983
INVENTOR(S) : Wayne G. Styck It is certified that error appears in the above-identified patent and that said Letters Patent are hereby corrected as shown below:

In the cover page:

After "United States Patent (19)", "Styok" should be changed to --Styck--.

After "(75) Inventor", "Styok" should be changed to --Styck--.

In the claims:

Column 5, claim 1, line 17, --and-- should be inserted after "engine".

Column 5, claim 1, line 23, "means" should be changed to --assembly--.

Signed and Sealed this

Ninth Day of October 1984

[SEAL]

Attest:

Attesting Officer

GERALD J. MOSSINGHOFF

Commissioner of Patents and Trademarks